Sept. 22, 1964        H. I. PODELL        3,149,654

THREADED FASTENER HAVING RESILIENT METAL LOCKING INSERT

Filed Dec. 19, 1960

INVENTOR
HOWARD I. PODELL
BY

HIS ATTORNEYS

United States Patent Office 3,149,654
Patented Sept. 22, 1964

3,149,654
THREADED FASTENER HAVING RESILIENT
METAL LOCKING INSERT
Howard I. Podell, Mamaroneck, N.Y., assignor to The
Nylok Corporation, Paramus, N.J., a corporation of
Delaware
Filed Dec. 19, 1960, Ser. No. 76,751
6 Claims. (Cl. 151—23)

This invention relates to the improvements in fastening devices and it relates more particularly to improvements in self-locking threaded fastening devices such as screws, bolts, nuts, threaded reducing elements, threaded couplings and the like which are particularly suitable for use at high temperatures.

It has been proposed heretofore to provide metallic locking devices, such as inserts, strips or keys, in threaded devices to render them resistant to loosening under vibration or impact. Such metallic locking devices are intended to enable the fastening devices to withstand higher temperatures which damage locking elements made of vulcanized fiber, nylon and other lower melting, resilient plastics. Metallic locking devices in practice, are not very satisfactory for the reason that they are difficult to secure to a threaded fastening device, and frequently are dislodged and lost. Moreover the pressure exerted by such devices cannot be maintained in a range which is adequate to produce a desired self-locking action without at the same time damaging the threads of the mating threaded element.

The basic problem that arises with the use of a metallic insert, such as a plug or strip of metal, becomes apparent when the relation between the modulus of the elasticity of metal and the commercial or military tolerances of a standard thread are taken into consideration. These thread tolerances are of the magnitude of several thousandths of an inch; for example, a 1/4–28 thread may vary in pitch diameter by three thousandths of an inch. The locking insert must permit deformation within the range of customary thread tolerances and must permit additional deformation for developing a locking action without setting up excessive forces. If a threaded device such as a screw is provided with a soft copper insert, distortion or compression of the copper to the amount of three thousandths of an inch would set up a minimum force of over fifty tons per square inch. Such enormous pressures render the locking device unsatisfactory for the reason that it is practically impossible to insert into a mating threaded element and it damages the threads of the element engaging it. When harder metals are used for the insert, these difficulties become even greater.

The ideal insert for operation under high temperature conditions should exert a constant unchanging force on the mating threaded element within a reasonable and desired range of pressures to produce an effective locking action without damaging the fastening elements and preventing their reuse.

In accordance with the present invention, an insert is provided which is of such shape that it absorbs the dimensional tolerances of the threads of the mating element while exerting a continuous force or pressure of predetermined and desired magnitude. More particularly, in accordance with the invention, an insert of a corrugated or wavy shape is mounted in a recess in a threaded fastening device with the mid portion or one of the troughs of the wavy insert bearing against the bottom of the recess and with one or more wave crests extending outwardly beyond the roots of the threads of the fastening device to engage the threads of a mating fastening element.

Inserts of the kind embodying the invention preferably are formed of metal but they can also be formed of other resilient, heat resisting material such as resin bonded fiber glass, metal-filled plastics such as bronze-filled "Teflon" (polytetrafluoroethylene), ceramic materials or the like.

The new insert is adapted to other uses and, for use in normal ranges or low temperatures, it can be made of suitable non-metallic materials. Moreover, it is useful in either male or female threaded fastening elements and in other frictionally retained elements, such as dowel pins and the like.

For a better understanding of the present invention, reference may be had to the accompanying drawing in which.

Figure 1:
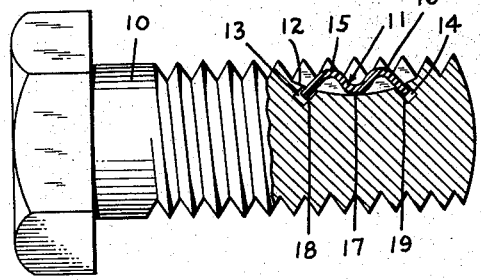
FIG. 1 is a view in side elevation and partly broken away of a typical male threaded fastening device containing an insert of the type embodying the present invention.
Figure 2:
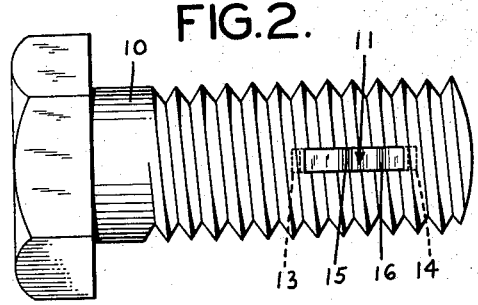
FIG. 2 is a view in side elevation taken at right angles to the view in FIG. 1 illustrating the shape and arrangement of the insert.

By way of illustration but not of limitation of the present invention, FIGS. 1 and 2 show a screw 10 of the hex-head type containing a locking insert 11 of the type embodying the present invention. As best shown in FIG. 1, a groove 12 is formed in one side of the screw extending lengthwise thereof. The groove 12 may be formed by milling, punching or in any other desired way. A pair of inclined recesses 13 and 14 are punched or drilled near the bottom of the opposite ends of the groove 12 to receive the ends of the corrugated or wavy insert member 11 of inverted W or M-shape which, for example, may be formed of a strip of a spring steel. The strip has a pair of wave crests 15 and 16, an interposed trough portion 17, and diverging opposite ends 18 and 19 which are slidably received in the recesses 13 and 14. The ends 18 and 19 are spaced from the bottoms of the recesses 13 and 14 to permit sliding movement therein but the over-all length of the insert is great enough to prevent the insert from being detached from the screw unless the insert is forcibly bent. With the ends of the insert engaged in the recesses, the trough 17 of the insert strip bears against the bottom of the slot or groove 12 thereby further assisting in retaining the insert against substantial radial and endwise movement in the slot. As shown in FIG. 2, the insert 11 is formed of a strip or ribbon of metal but it will be understood that it can be a corrugated or wavy rod of cylindrical, circular or other cross section.

The radial dimension from the bottom of the trough 17 to the top of the crests 15 and 16 of the insert is such that when the trough 17 engages the bottom of the slot, the crests 15 and 16 are disposed radially outside the root lines of the threads on the screw 10.

When a nut is threaded onto the screw or the screw is inserted into a threaded opening, the mating threads on the nut or in the opening engage the crests 15 and 16 of the insert and compress them inwardly, thereby tending to flatten them under compression. The insert also flexes around the trough 17 as a fulcrum and the ends 18 and 19 of the insert will be forced against the inner sides of the recesses and will move inwardly toward the bottoms of the recesses 13 and 14 without, however, bottoming against the bottoms of the recesses. Some of the compressive stresses will be exerted against the sides of the recesses so that substantially the entire insert will resiliently resist compression. The resistance of the spring insert remains substantially uniform throughout its normal (in use) flexing range due to the distribution of the bending stresses through substantially the entire length of the insert.

By regulating the thickness of the insert and its resiliency or springiness, a controlled reaction can be produced which urges the screw laterally to force the threads of the screw diametrically opposite from the insert into cohesive frictional engagement with the threads of the mating nut or opening.

Figure 3:
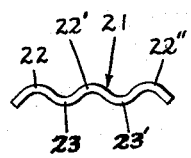
FIG. 3 is a view in side elevation of a modified form of insert embodying the present invention.

It will be understood that the shape and size of the insert can be varied. For example, as shown in FIG. 3, the insert 21 is provided with three crest portions 22, 22′ and 22″ and two intermediate trough portions 23 and 23′. Such an insert can be used, of course, in a longer slot or it may be formed of material of smaller cross-sectional dimensions to fit in a slot of the same dimensions as those for receiving the double crest insert as shown in FIGS. 1 and 2.

Figure 4:
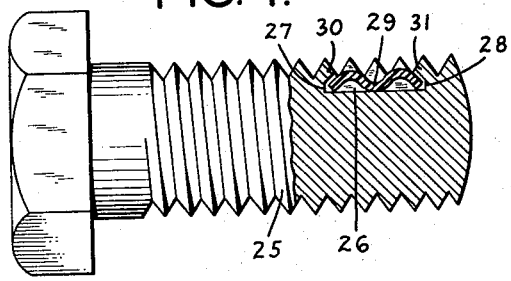
FIG. 4 is a view in side elevation and partly broken away of a modified mounting of the insert in a male thread and fastening element.

Also, as shown in FIG. 4, the shape of the slot in the threaded member can be varied. Thus, the screw 25 as shown in FIG. 4 may be provided with a rectangular slot 26 having end portions 27 and 28 extending substantially perpendicular to the axis of the screw. After the wavy insert member 29 is dropped into the slot, the edges of the material at the ends of the slot can be staked or bent over as at 30 and 31 to retain the insert in the slot.

While the invention is illustrated as embodied in a screw, it will be understood that similar inserts may be used in bolts, turnbuckles, nuts, reducing inserts for the threaded holes, in threaded rod and pipe couplings or in other devices used with a friction or drive fit.

While the insert preferably is made of a spring metal such as spring steel, spring bronzes and the like, it can also be made of other springy materials for use at ordinary temperature conditions or temperatures somewhat above or below normal atmospheric temperatures. Thus, the inserts can be formed of resin-bonded fiber glass, of the harder forms of nylon and other resilient plastics or from metallized plastics having substantial temperature resistance coupled with resiliency. Accordingly, the forms of the invention described herein should be considered as illustrative and the invention as limited only by the terms of the following claims.

I claim:

1. A self-locking fastener comprising a member having a shank portion with threads thereon, a groove in said shank portion extending lengthwise thereof and having a bottom spaced radially behind the roots of said threads, an elongated resilient metal insert member of corrugated longitudinal section having a plurality of crest portions, at least one trough portion between a pair of crest portions and opposite free ends, said insert member being disposed in said groove with the trough portion adjacent to said bottom and the crest portions extending outwardly beyond the roots of the threads adjacent thereto, and retaining means adjacent to the opposite ends of said groove overlying and engaging said free ends of said insert member and retaining it in said groove, said free ends being slidable relative to said retaining means to enable said insert member to flex substantially throughout its length.

2. A self-locking fastener comprising a member having a portion with threads thereon and a groove therein intersecting a plurality of said threads and having a bottom spaced behind the roots of said threads, an elongated resilient metal insert member of corrugated longitudinal section having a pair of spaced crest portions, an interposed trough portion and opposite free end portions, said insert member being disposed in and lengthwise of said groove and outwardly converging recesses adjacent to opposite ends of said groove and slidably receiving both of said free end portions and retaining said insert member in said groove with said crest portions disposed outwardly of the roots of the threads intersected by said groove.

3. The fastener set forth in claim 1 in which said retaining means comprises oppositely inclined outwardly converging recesses in the bottom of said groove slidably receiving the free ends of said insert member.

4. The fastener set forth in claim 1 in which said groove has closed opposite ends and said retaining means comprises portions of said member at the ends of said groove disposed outwardly of and slidably engaging the outer surface of said free ends of said insert member.

5. The fastener set forth in claim 2 in which said insert member has inwardly diverging relatively inclined free end portions.

6. The fastener set forth in claim 2 in which said insert member comprises at least three crest portions and at least two trough portions.

References Cited in the file of this patent

UNITED STATES PATENTS

| | | |
|---|---|---|
| 447,697 | Pollard | Mar. 3, 1891 |
| 1,212,394 | Peirce | Jan. 16, 1917 |
| 1,379,394 | Cocks | May 24, 1921 |
| 1,691,964 | Dickey et al. | Nov. 20, 1928 |